US009380493B2

United States Patent
Scheim et al.

(10) Patent No.: US 9,380,493 B2
(45) Date of Patent: Jun. 28, 2016

(54) CELLULAR OFFLOADING SYSTEM FOR VEHICLES APPROACHING ACCESS POINTS

(71) Applicant: GM Global Technology Operations LLC, Detroit, MI (US)

(72) Inventors: Kobi Jacob Scheim, Pardess Hanna (IL); Nadav Lavi, Ramat-Hasharon (IL); Moshe Laifenfeld, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 13/833,496

(22) Filed: Mar. 15, 2013

(65) Prior Publication Data

US 2014/0274069 A1 Sep. 18, 2014

(51) Int. Cl.
*H04W 36/00* (2009.01)
*H04W 28/08* (2009.01)
*H04W 64/00* (2009.01)
*H04W 36/32* (2009.01)

(52) U.S. Cl.
CPC .......... *H04W 28/08* (2013.01); *H04W 36/0083* (2013.01); *H04W 36/32* (2013.01); *H04W 64/003* (2013.01)

(58) Field of Classification Search
CPC ..... H04W 4/046; H04W 16/08; H04W 28/02; H04W 28/08; H04W 36/24; H04W 36/30; H04W 36/32; H04W 48/18; H04W 48/20; H04W 84/10; H04W 84/12; H04W 84/16; H04W 36/0083; H04W 64/0003
USPC .......................................... 455/436–444, 453
See application file for complete search history.

(56) References Cited

U.S. PATENT DOCUMENTS

| 2004/0053630 A1* | 3/2004 | Ramos et al. ................. 455/453 |
| 2004/0218605 A1* | 11/2004 | Gustafsson et al. ....... 370/395.2 |
| 2007/0142050 A1* | 6/2007 | Handforth et al. ............ 455/436 |

* cited by examiner

*Primary Examiner* — Rafael Perez-Gutierrez
*Assistant Examiner* — Thai Vu
(74) *Attorney, Agent, or Firm* — Mark S. Cohen; Pearl Cohen Zedek Latzer Baratz LLP

(57) ABSTRACT

Systems and methods for compiling lists of prospective access points for offloading cellular data traffic for a vehicle, and for selecting an access point to establish a non-cellular wireless Internet connection. Vehicular data mobile access involves properties and characteristics different from those of portable user data devices, and thus exhibit different criteria for cellular data offloading. Embodiments of the invention provide vehicle metrics to be used in conjunction with data requirement metrics in compiling the access lists and making the optimum selections based on the vehicle's predicted route. A predictive look-ahead is also provided, for use when predictive routing information is not available or is unreliable.

10 Claims, 6 Drawing Sheets

CELLULAR OFFLOADING SYSTEM FOR VEHICLES APPROACHING ACCESS POINTS

BACKGROUND

Cellular telephony networks have been adapted to carry Internet data traffic, but the ongoing rapid increase in data demand by the growing population of smartphones and similar mobile devices has placed heavy burdens on the ability of cellular networks to handle the data traffic. In response to this challenge, cellular operators have implemented technologies for off-loading data traffic from cellular networks onto other networks. Solutions include private offloading systems set up by cellular operators, public non-cellular wireless Internet connections by arrangement with various commercial entities, open networks established by municipalities and public areas such as shopping malls, and similar setups to accommodate mobile users.

In addition, various commercial enterprises now implement aspects of cellular offloading standards established as part of the evolving system architecture standards for mobile networks, such as Access Network Discovery and Selection Function ("ANDSF"), whose purpose is to assist user devices to discover non-cellular network access points which can be used for data communications (such as Wi-Fi), and to provide the user devices with policies (rules) regarding connections to such network access points. Commercial enterprises also maintain extensive access point maps and provide facilities and software so that user devices can automatically select access points and establish connections to them.

Connection policies for prospective access points typically involve a number of metrics, such as those related to Quality of Service (QoS), security level, backhaul quality, and bandwidth requirements. In order to be eligible for selection, a prospective access point must meet such requirements. For example: the available bitrate of a prospective access point must be sufficient to support the bitrate required by the off-loaded data connection, and the prospective access point must have a current loading less than a predetermined threshold. Typically, a target function of the metrics is defined, and the choice of access point may be based on the target function. If a number of prospective access points pass the filtering of the target function, one of them may be selected at random for the access point. Alternatively, one may be selected according to a function of the various metrics used.

In one mode of operation (a "real-time" mode), the user device receives connection selection commands as needed from a server according to an established policy. In another mode of operation (an "autonomous distributed" mode), a predetermined policy is downloaded to the user device, which makes connection selection decisions according to the stored policy, such as discussed above. Maps or lists of available access points may accompany the policy.

Currently, the focus and orientation for data offloading and policy control therefor is targeted to consumer mobile devices (e.g., smartphones), and consequently is based on the environments and characteristics of the users themselves—for example: where is a user likely to go with his or her smartphone (e.g., a coffee shop, a stadium, an office building, etc.)? How long is the user's mobile device likely to remain connected to a particular access point (e.g., 10-15 minutes, 1-2 hours, etc.)? Although such considerations may not necessarily be explicitly formalized in terms of metrics for data offloading policies and decision-making, they imply an underlying context which influences the choice and handling of access point policy and selection factors. That is, data offloading policies and access point connection decisions are tailored according to the view that the mobile device is a piece of handheld equipment carried on the person of a user. Commercially, for the bulk of the mobile device market, this is a reasonable approach.

However, an important and developing area for mobile devices now centers on the vehicle market. Currently, a vehicle may be equipped with on-board integrated cellular, non-cellular wireless Internet connectivity, GPS, and infotainment capabilities. From a data perspective such a vehicle is considered as a "vehicle telematics entity" or a "connected vehicle". Benefits of connected vehicles include: vehicle and contents tracking; fleet management; route planning and navigation, such as turn-by-turn navigation; emergency warning and safety communications; pay-as-you-drive vehicle rental and leasing arrangements; and driver monitoring and insurance compliance.

In terms of data offloading, it is important to realize that a connected vehicle itself is the data client, rather than the user (such as a driver or passenger). Unfortunately, the underlying context according to which data offloading policy and decision-making are based is that of a human user's behavior and environment. This is not necessarily applicable for vehicle data clients. It is thus highly desirable to have new methods and systems for establishing data offloading policy and making data offloading selections and decisions in cases where a vehicle is the client. This goal is met by embodiments of the present invention.

SUMMARY

Embodiments of the present invention provide methods and systems for establishing and applying data offloading policies, and for making data offloading selections and decisions for vehicle data clients.

Aspects where vehicle clients are operationally distinct from user clients include, but are not limited to, the following:

- The average vehicle typically exhibits much more rapid and dramatic changes in location than the average user. Consequently, the average vehicle requires far more frequent change in access point than the average user. This can be a significant factor influencing data offloading policy. Transfer from a cellular data connection to a non-cellular wireless Internet access point, as well as transferring a connection from one non-cellular wireless Internet access point to another are typically more complex than cellular handoff from one cell to another.
- Vehicle data can include vehicle-specific data which is automatically generated for upload and/or automatically requested for download. In addition, the vehicle can provide a local access point for data offload of user devices belonging to the occupants of the vehicle—which can perhaps include multiple user devices. In such cases, the average vehicle demand for data offload can be much higher than the average user demand for data offload.
- Vehicle locations are typically more highly constrained than those of a user. Vehicles are typically bound to roads, parking areas and garages, etc., and are rarely found in buildings and similar indoor areas. In many cases, paths on roads taken by vehicles are preplanned and/or may be predicted to some degree.

DEFINITIONS

The term "mobile data device" herein denotes a device capable of maintaining a wireless data connection to the Internet, including, but not limited to: smartphones; and portable computers, such as notebook (or "laptop") computers and tablet computers.

The terms "non-cellular wireless Internet connection" and "non-cellular wireless Internet connectivity" herein denote a wireless connection between a mobile data device and a data network which provides Internet access but is not a cellular telephony network. Hence, the terms "data offloading" and "offloading" herein relate to transferring a data connection from a cellular telephony network to a non-cellular wireless Internet connection, as herein defined. The term "offloaded data" herein denotes data carried over a non-cellular wireless Internet connection which would otherwise have to be carried over a cellular telephony network. Data networks providing Internet access for a non-cellular wireless Internet connection include, but are not limited to: Local Area Networks (LANs); Metropolitan Area Networks (MANs); and networks complying with subsections of the IEEE 802 family. Devices providing non-cellular wireless Internet connections to such data networks include, but are not limited to: Wi-Fi devices; and WiMAX devices. In the present disclosure, Wi-Fi devices are used as examples for purposes of illustration, it being understood that such examples and embodiments of the invention corresponding thereto are non-limiting. In addition, certain technologies (a non-limiting example of which is WiMAX) can function in both cellular and non-cellular networks. In the case of such technologies, it is understood that the designation "non-cellular" indicates that the applicable networks in which such technologies function are restricted to non-cellular networks.

The term "access point" herein denotes a device providing a non-cellular wireless Internet connection. The term "hotspot" herein denotes an access point for a non-cellular wireless Internet connection as well as the physical area in the immediate vicinity of the access point, within the usable wireless range of the access point.

Therefore, according to an embodiment of the present invention, there is provided a method for compiling a predictive offload access point list for a vehicle, the list containing at least one prospective access point for establishing a non-cellular wireless Internet connection for the vehicle, the method including: (a) receiving a vehicle metric specifying at least one vehicle-related state of the vehicle; and (b) responsive to the vehicle metric, filtering at least one prospective access point according to the vehicle metric to obtain the predictive offload access point list.

In addition, according to another embodiment of the present invention, there is provided a system for compiling a predictive offload access point list for a vehicle, the list containing at least one prospective access point for establishing a non-cellular wireless Internet connection for the vehicle, the system including: (a) a processing device for: (b) receiving a vehicle metric specifying at least one vehicle-related state of the vehicle; and (c) responsive to the vehicle metric, filtering the at least one access point according to the vehicle metric to obtain the predictive offload access point list.

BRIEF DESCRIPTION OF THE DRAWINGS

The subject matter disclosed may best be understood by reference to the following detailed description when read with the accompanying drawings in which.

Figure 1:
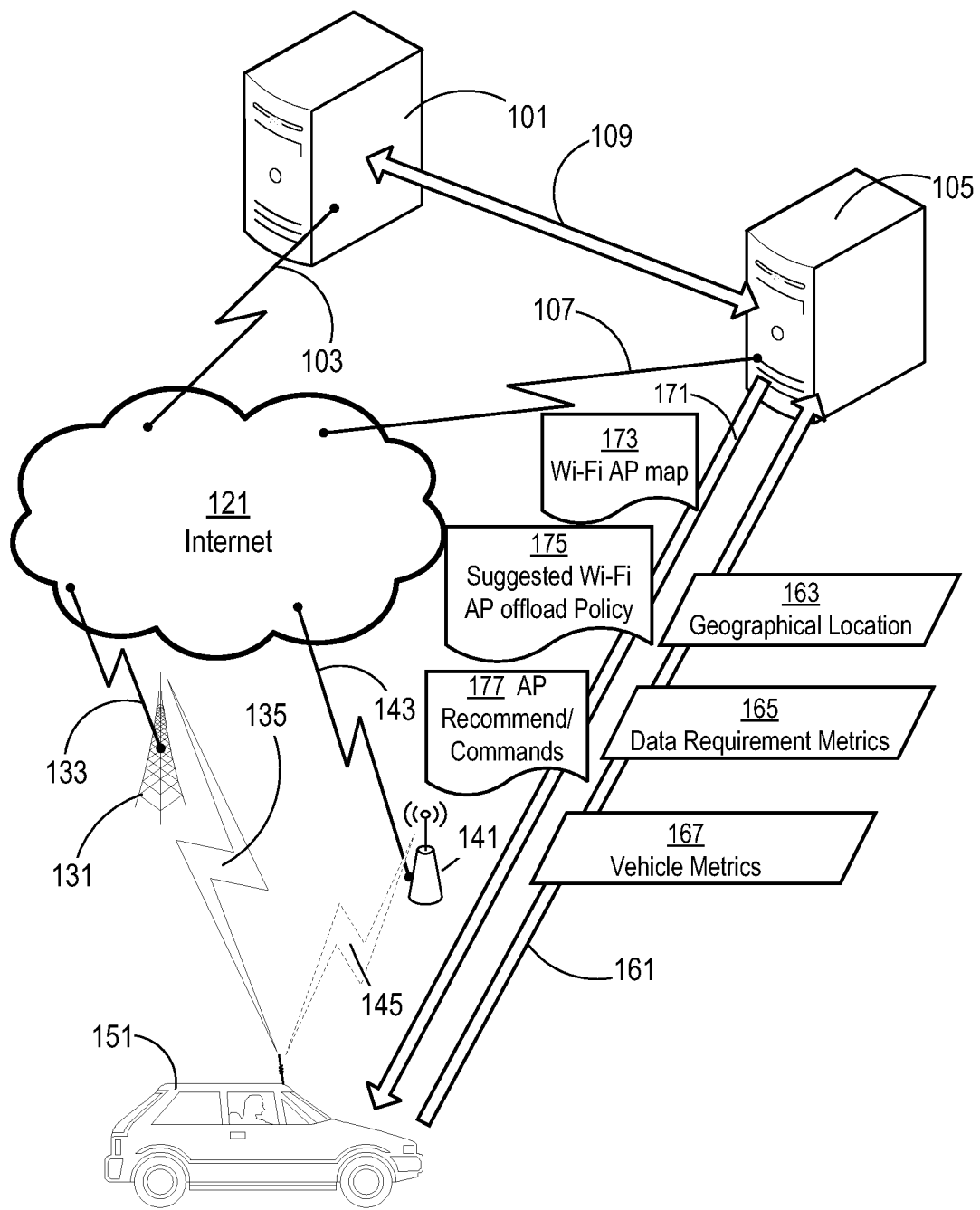
FIG. 1 conceptually illustrates a system according to an embodiment of the present invention.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

FIG. 1 conceptually illustrates a system according to an embodiment of the present invention. A server 101 provides route guidance and travel assistance to the driver and/or passengers of a vehicle 151, such as through turn-by-turn navigation, travel advisories, warnings, and road-service advice and access. In various embodiments of the invention, server 101 is a navigational server, a telematics server, and an automotive services server. Server 101 is connected to the Internet 121 via a connection 103. A cellular base station 131 is connected to Internet 121 via a data connection 133 and also to a cellular telephony network (not shown). Vehicle 151 is connected to cellular base station 131 via a cellular connection 135, and is capable of establishing and maintaining a data connection to Internet 121 via cellular wireless connection 135.

In embodiments of the invention exemplified by FIG. 1, vehicle 151 is a data offload client for a Wi-Fi offload server 105, which is connected to Internet 121 via a connection 107. Offload server 105 has a virtual connection 109 to server 101. In addition, offload server 105 can establish and maintain a virtual upload connection 161 and a virtual download connection 171 with vehicle 151. Vehicle 151 uploads a geographical location 163 (such as geographical coordinates via a GPS receiver) data requirement metrics 165 and vehicle metrics 167 to offload server 105. Offload server 105 downloads a Wi-Fi access point map 173, a suggested Wi-Fi offload policy 175, and access point recommendations and commands 177 to vehicle 151.

According to an embodiment of the invention, vehicle metrics 167 relate to the current state of the vehicle as determined by in-vehicle instrumentation, and includes, but is not limited to, the following states as shown in Table 1:

TABLE 1

| State | Used by embodiments for |
| --- | --- |
| predicted navigational route | planning |
| steering wheel (via a sensor) | prediction |

TABLE 1-continued

| State | Used by embodiments for |
|---|---|
| brake (via a sensor) | prediction |
| accelerator (via a sensor) | prediction |
| turn signal (via a sensor) | prediction |
| current road and direction | planning |
| speed | offload decision and timing |
| gear (N, P, D etc., via a sensor) | activation |
| geographical location | activation |

According to related embodiments of the invention, certain factors in Table 1 can be utilized in other capacities, involving data strategies besides offloading decisions. In a non-limiting example, a vehicle may be parked or standing (in Parked or Neutral gear, or with zero speed and brake applied) with a high-quality, high-bitrate non-cellular wireless Internet connection from a nearby access point. According to these embodiments, this is a good opportunity to download useful data that may shortly be more difficult to download when the vehicle moves out of the range of this high-quality access point.

According to a particular embodiment of the invention, vehicle 151 sends periodic updates of data requirement metrics 165 and vehicle metrics 167 to offload server 105, and offload server 105 responds with access point recommendations and connection commands 177. According to another embodiment of the invention, offload server 105 provides access point access point map 173 and offload policy 175 to vehicle 151, and afterwards vehicle 151 makes selection and connection decisions in an autonomous manner. Through either of these embodiments, a prospective Wi-Fi access point 141 can be recommended to vehicle 151 as a non-cellular wireless Internet connection. Access point 141 is connected to Internet 121 via a connection 143, and if vehicle 151 connects to access point 141 via a new non-cellular wireless Internet connection 145, then data traffic will be offloaded from cellular connection 135 to non-cellular connection 145. If vehicle 151 cannot be offloaded to a non-cellular access wireless Internet connection, then vehicle 151 will continue to use cellular connection 135 for data.

Figure 2:
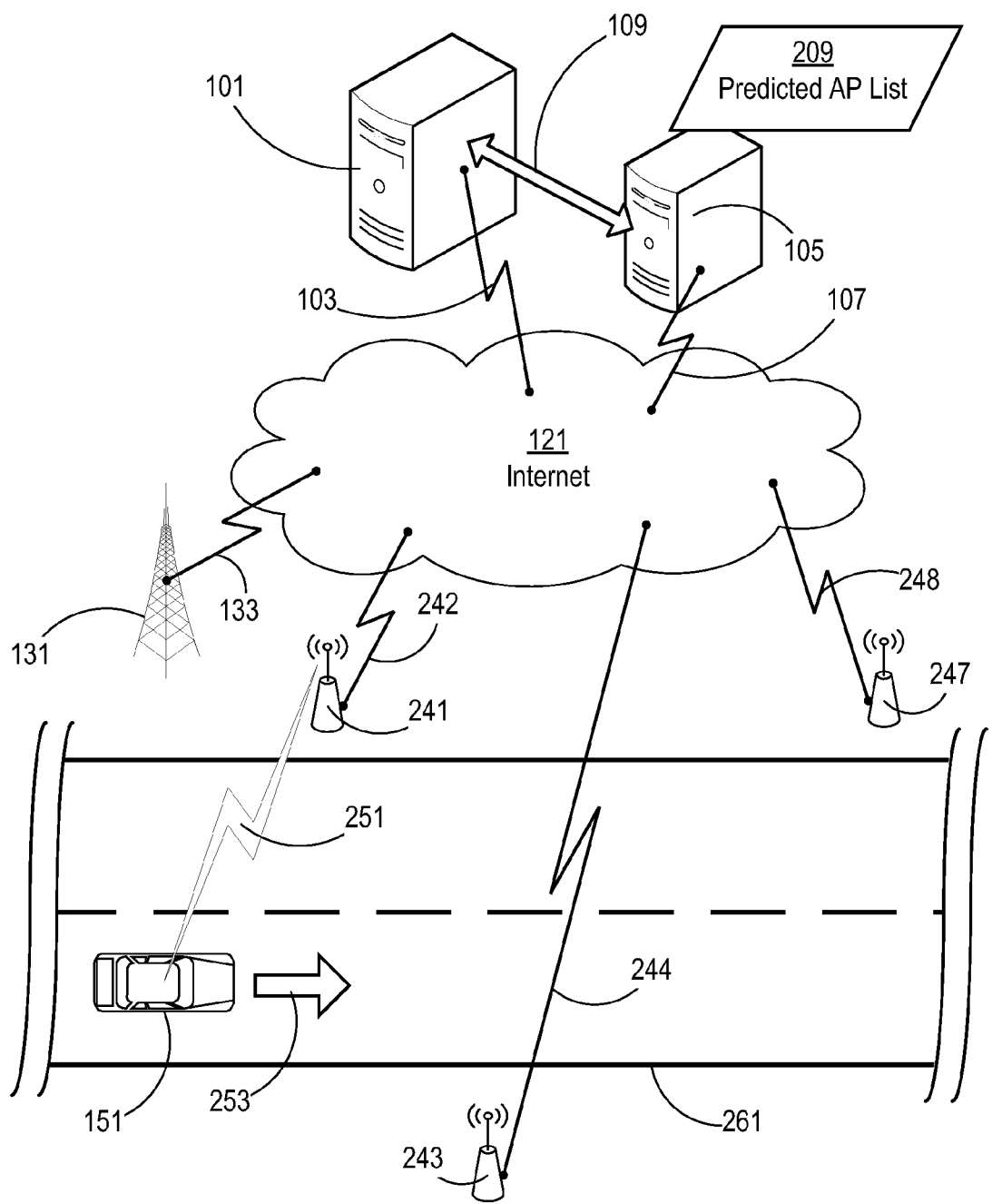
FIG. 2 conceptually illustrates access point transfer according to an embodiment of the present invention.

FIG. 2 conceptually illustrates access point transfer according to an embodiment of the present invention. Vehicle 151 is traveling along a road segment 261 in a direction 253, along which are a number of access points corresponding to successive locations of a predictive route of vehicle 151, a representative sample of which include an access point 241, an access point 243, and an access point 247, which are connected to Internet 121 via connections 242, 244, and 248, respectively. In its current position, vehicle 151 is connected to access point 241 via a non-cellular wireless Internet connection 251. Thus, access point 241 is denoted as the "current access point connection", and is symbolically designated as $AP_i$. As before, if vehicle 151 cannot obtain a non-cellular wireless Internet connection (such as non-cellular wireless Internet connection 251), then vehicle 151 will obtain a cellular data connection (such as via cellular base station 131).

In an embodiment of the invention, offload server 105 contains a list 209 of predicted offload access points for vehicle 151 traveling along road 261. In the non-limiting example of FIG. 2, access point 243 would be the next access point approached by vehicle 151, and is denoted as the "next potential connection", with a symbolic designation $AP_{i+1}$. Access point 247 would follow, and is given the symbolic designation $AP_{i+2}$. Thus, list 209 contains $AP_i, AP_{i+1}, AP_{i+2}$, . . . corresponding to the predicted route of vehicle 151. List 209 contains at least one prospective access point for establishing a non-cellular wireless Internet connection for vehicle 151, and the data characteristics of the at least one prospective access point.

Figure 3:
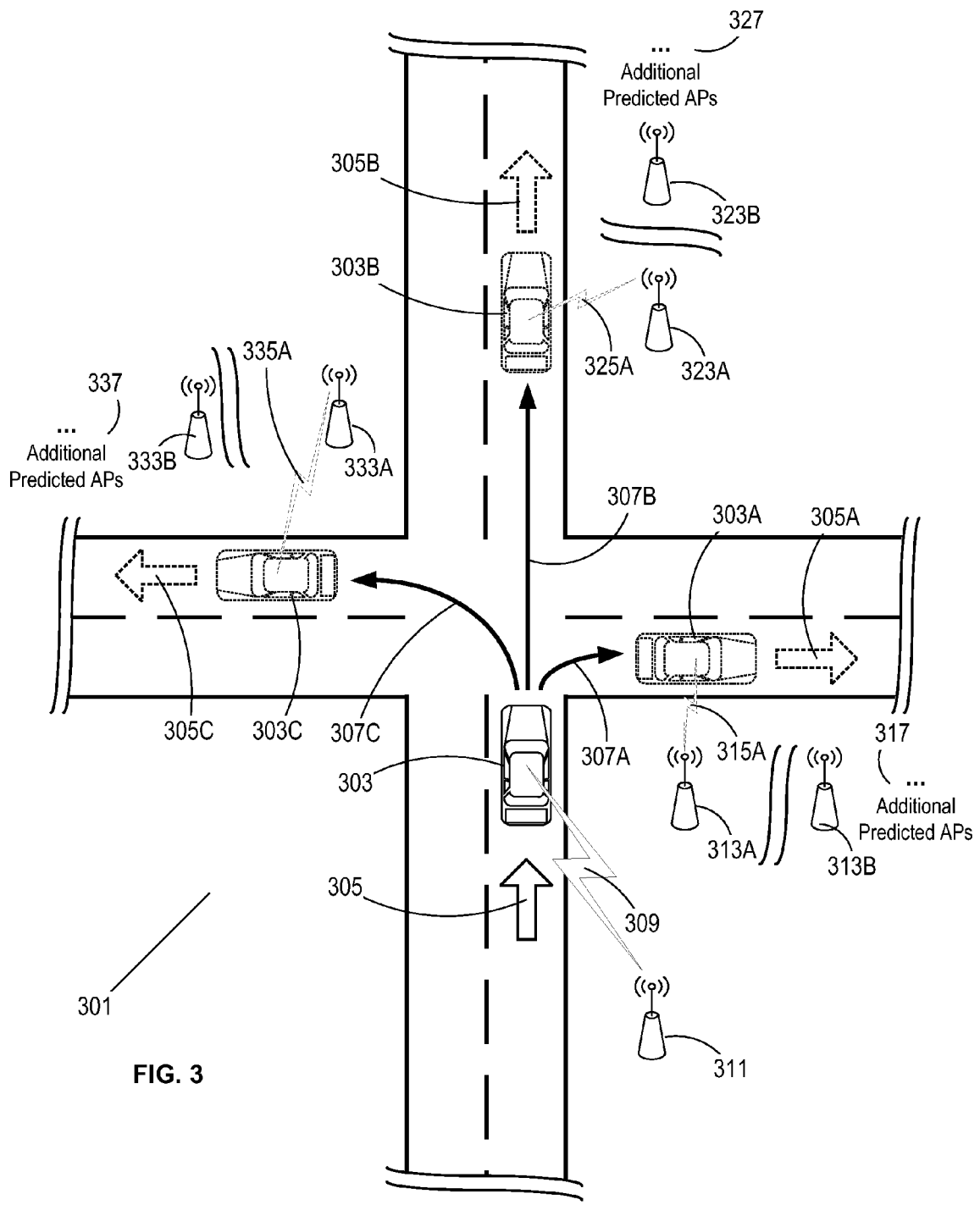
FIG. 3 conceptually illustrates an example of an access point predictive look-ahead situation according to an embodiment of the present invention.

FIG. 3 conceptually illustrates an example of an access point predictive look-ahead situation according to an embodiment of the present invention. A vehicle 303 approaches an intersection 301 in a direction 305, having a current non-cellular wireless Internet connection 309 with a current access point 311. In some cases, as previously noted herein, an offload server (such as server 105 in FIG. 1 and FIG. 2) has a predicted navigational route for vehicle 303 (such as from server 101 in FIG. 1 and FIG. 2), but this may not always be the case. In some cases, there may be an established navigational route, but this route may not be available to the offload server. In other cases, a navigational route may not exist, such as when the driver is not following an established route, and is making turn decisions as the need arises. FIG. 3 illustrates the case where vehicle 303 has arrived at intersection 301 and there is no established route available. For this case, an embodiment of the invention provides a predictive look-ahead for multiple possible routes (three in this non-limiting example) which diverge from the current route of vehicle 151 as alternative route choices:

The driver makes a right turn 307A, after which the vehicle will be in a position 303A moving in a direction 305A. In this case, the next predicted access point will be an access point 313A, for which the next connection will be a non-cellular wireless Internet connection 315A. An access point 313B is designated as a subsequent predicted access point for this possibility, and the ellipsis 317 indicates that additional predicted access points may exist further on in direction 305A.

The driver continues in a straight-ahead path 307B, after which the vehicle will be in a position 303B moving in a direction 305B. In this case, the next predicted access point will be an access point 323A, for which the next connection will be a non-cellular wireless Internet connection 325A. An access point 323B is designated as a subsequent predicted access point for this possibility, and the ellipsis 327 indicates that additional predicted access points may exist further on in direction 305B.

The driver makes a left turn 307C, after which the vehicle will be in a position 303C moving in a direction 305C. In this case, the next predicted access point will be an access point 333A, for which the next connection will be a non-cellular wireless Internet connection 335A. An access point 333B is designated as a subsequent predicted access point for this possibility, and the ellipsis 337 indicates that additional predicted access points may exist further on in direction 305C.

According to an embodiment of the invention, the above look-ahead is computed as soon as possible, so that when the driver of vehicle 151 selects one of the above alternative routes, the proper predictive access point list will already be available for immediate use. In a related embodiment, the unused look-ahead information is discarded as soon as the vehicle is committed to one of the alternatives. In another embodiment of the invention, the prediction method presented for cases where no navigational information is available can also be used for cases where navigation information is in place and a route is given. As in some cases of the turn-by-turn navigation mode, the driver may take his or her own decisions or take erroneous turns due to confusion, and the method of generating a predictive list prior to a junction is useful to support both cases (with or without navigation data-assisted driving). The above mentioned predicted list is provided in an embodiment of the invention on a turn-by-turn fashion or as a full list for all the expected turns along a predetermined route in the case of point-to-point navigation.

Figure 4:
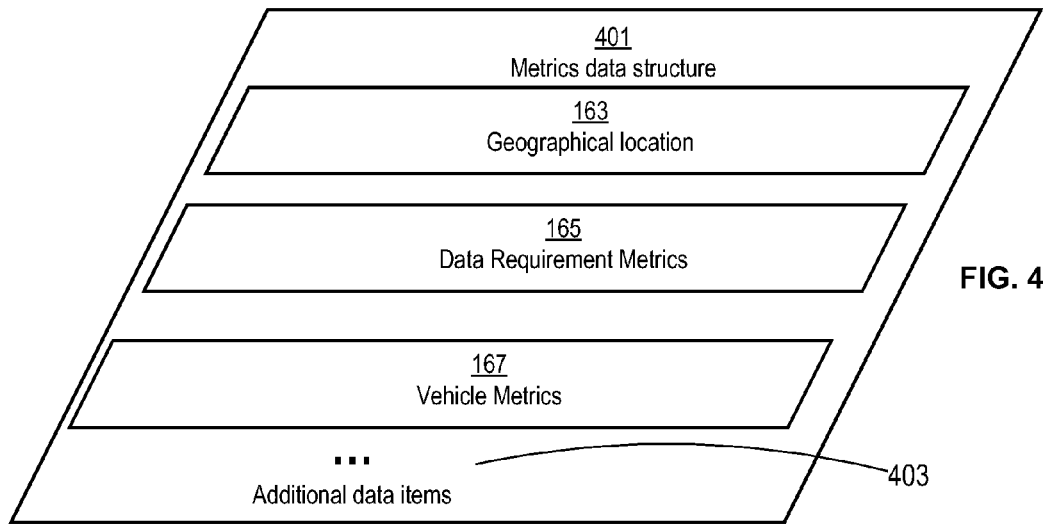
FIG. 4 conceptually illustrates a data structure for metrics used in selecting access points for a non-cellular wireless Internet connection according to an embodiment of the present invention.

FIG. 4 conceptually illustrates a data structure 401 for metrics used in selecting access points for a non-cellular wireless Internet connection according to an embodiment of the present invention. Data structure 401 includes geographical location 163, data requirements metrics 165, and vehicle metrics 167. An ellipsis 403 indicates that data structure 401 can include additional data items.

According to certain embodiments of the invention, data requirement metrics 165 involve data requirement factors including: a desired minimum bitrate; one or more types of data being transmitted and/or received (e.g., streaming video, Voice Over IP, etc.); a desired minimum signal strength; Quality of Service guidelines; and security level. In a related embodiment, metrics 165 specifies at least one such data requirement for vehicle 151.

Figure 5:
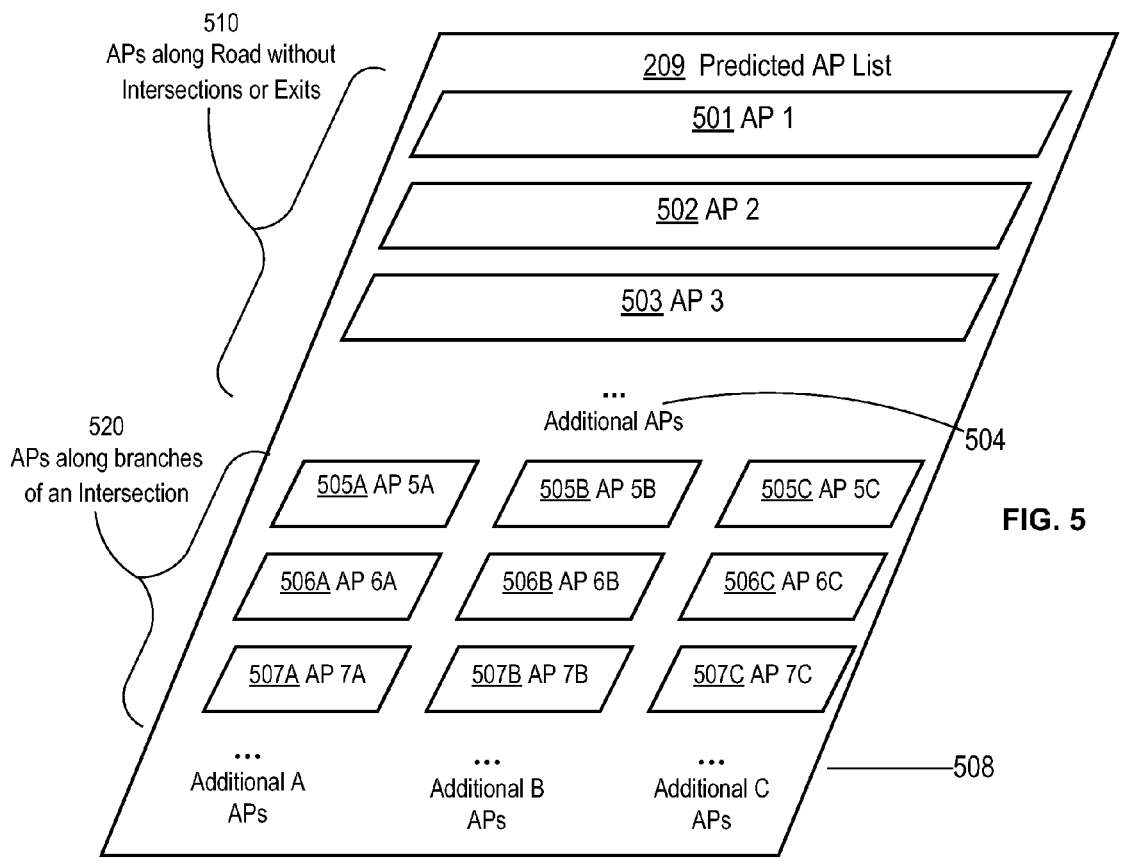
FIG. 5 conceptually illustrates a data structure for a predicted offload access point list for non-cellular wireless Internet connections according to an embodiment of the present invention.

FIG. 5 conceptually illustrates the details of data structure 209 for a predicted offload access point list for non-cellular wireless Internet connections according to an embodiment of the present invention. Entries 501, 502, and 503 correspond to access points 510 along a road or highway segment without intersections or exits, such as road segment 261 (FIG. 2). An ellipsis 504 indicates that additional entries may be in data structure 209 following entry 503. Entries 505A, 505B, 505C, 506A, 506B, 506C, 507A, 507B, and 507C correspond to access points 520 along branches of road segments that represent different routes diverging from an intersection or highway exit configuration, such as intersection 301 (FIG. 3). Ellipses 508 indicate that additional entries may be in data structure 209 following entries 507A, 507B, and 507C.

According to various embodiments of the invention, entries in a predicted offload access point list are access point identifiers. An access point identifier contains information including, but not limited to: geographical coordinates of the access point; network address of the access point; public name/service set identification (SSID) of the wireless network connected to the access point; network address of the access point; and technical data relating to the access point, such as security method (if any), signal strength, radio type, and so forth.

Figure 6:
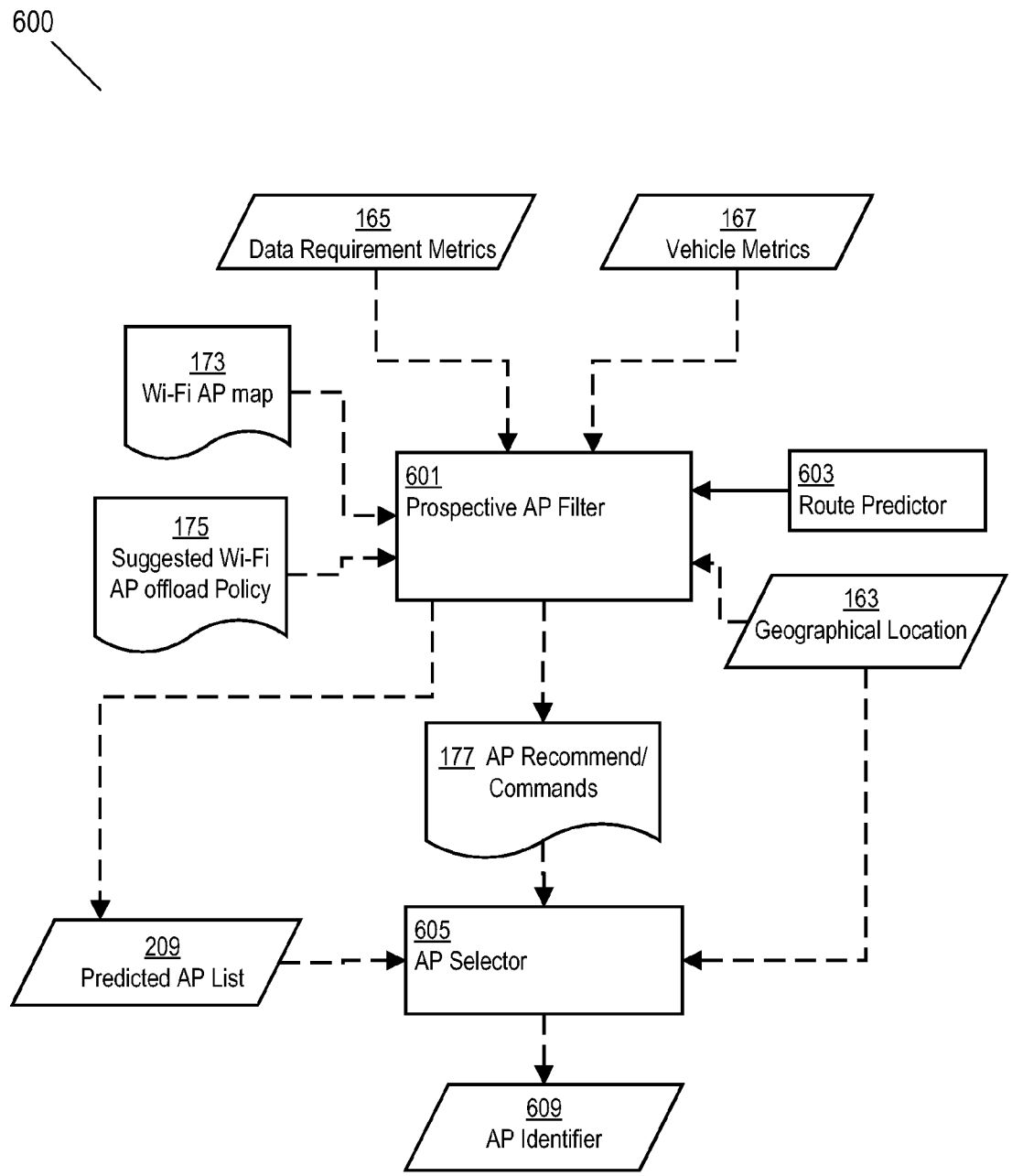
FIG. 6 is a conceptual block diagram of a system for compiling a predicted offload access point list and selecting an access point for a non-cellular wireless Internet connection according to an embodiment of the present invention.

FIG. 6 is a conceptual block diagram of a system 600 for compiling predicted offload access point list 209 and selecting an access point for a non-cellular wireless Internet connection according to an embodiment of the present invention. A prospective access point filter 601 receives input of data metric requirements 165 and vehicle metric requirements 167, Wi-Fi access point map 173, suggested Wi-Fi access point policy 175, geographical location 163, and a route from a route predictor 603. In a related embodiment, route predictor 603 is a navigational device or server (such as server 101 in FIG. 1). Prospective access point filter 601 outputs predictive offload access point list 209 and access point recommendation and selection commands 177. In another related embodiment, access point recommendation and selection commands 177 comply with policy 175. An access point selector 605 receives input from predictive offload access point list 209 and geographical location 163, and outputs an identifier 609 for a selected access point, with which a non-cellular wireless Internet connection may be established, for offloading data or for offloaded data.

In an embodiment of the invention, access point filter 601, route predictor 603, and access point selector 605 are implemented in a remote processing device (such as a server) which is connected to the vehicle via the Internet (cellular or Wi-Fi, depending on the availability at the time). In another embodiment, these components are implemented in a local processing device of the vehicle. In still another embodiment, both a remote and a local processing device of the vehicle share the implementation of these components.

According to further embodiments of the invention, other vehicle-related factors may be considered when compiling a predictive offload access point list and for selecting an access point for a non-cellular wireless Internet connection. In some cases, a number of vehicles requiring data offloading may be found in the same vicinity in traffic. Offload server 105 may then make different offloading recommendations for the various vehicles to balance the load among several prospective access points. This is a situation for which vehicle metrics 167 from the individual vehicles will not be sufficient for optimal offloading, because the individual vehicle metrics do not take the data requirements of the other nearby vehicles into account.

Figure 7:
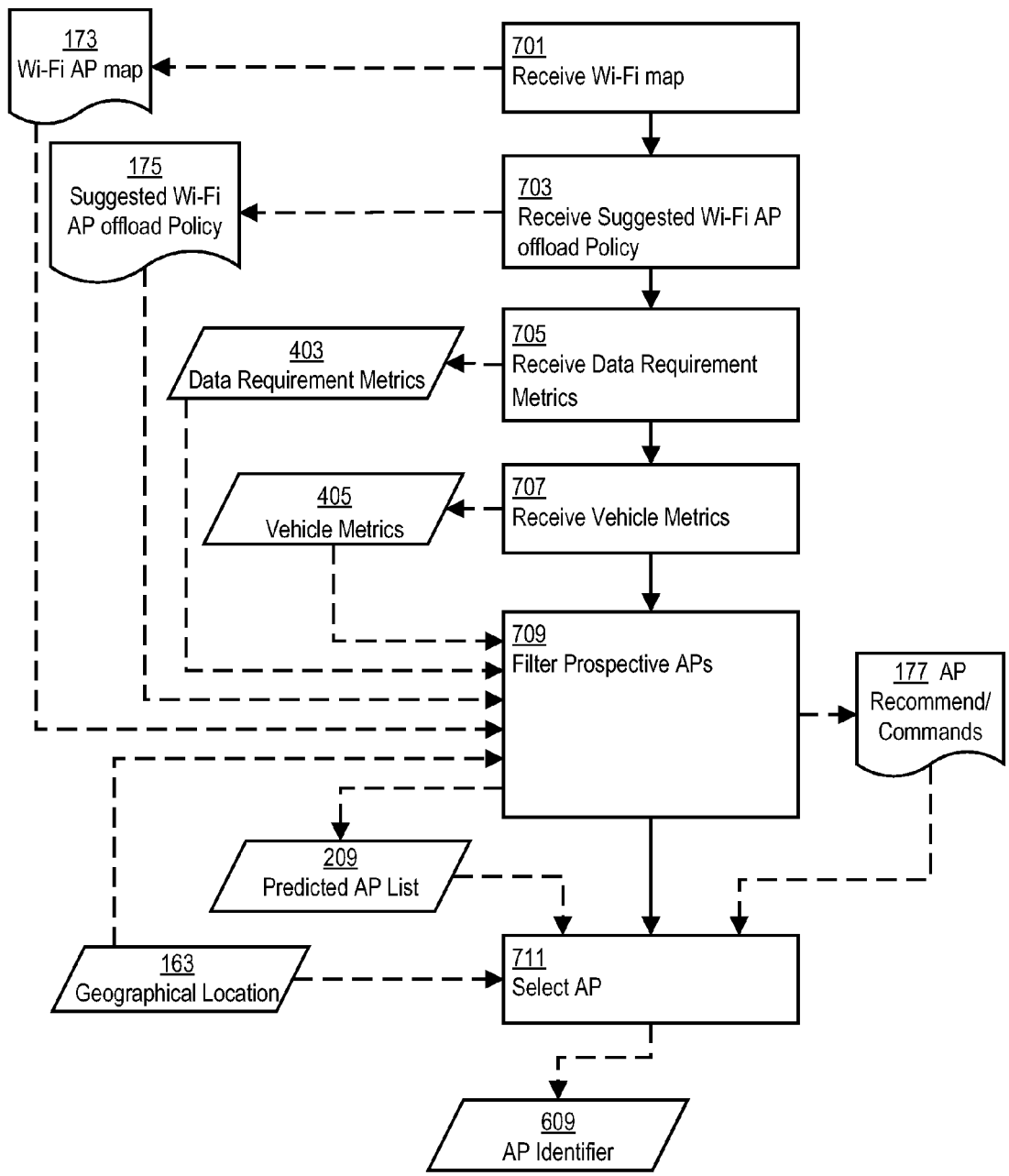
FIG. 7 is a flowchart of a method for compiling a predicted offload access point list and selecting an access point for a non-cellular wireless Internet connection according to an embodiment of the present invention.

FIG. 7 is a flowchart of a method for compiling predicted offload access point list 209 and selecting an access point for a non-cellular wireless Internet connection according to an embodiment of the present invention. In a step 701, Wi-Fi access point map 173 is received and stored. In various embodiments, access point map 173 is typically a small sub-portion of a much larger map. In one embodiment of the invention, the subset corresponds to the vicinity of the actual geographical location of vehicle 151 and typically contains only a few access points of immediate interest. In another embodiment the subset may include a larger map which is still a sub-portion of an even larger map corresponding to a geographical area where the vehicle is expected to stay according to a driving route request. In a step 703 suggested access point policy 175 is received and stored. In a step 705 data requirement metrics 403 are received and stored. In a step 707 vehicle metrics 405 are received and stored. Steps 701, 703, 705, and 707 may be performed simultaneously or in any convenient order. In a step 709, the access points in map 173 are filtered and a set of acceptable access points is compiled into list 209. According to a related embodiment, access point recommendations and commands 177 are also derived. Finally, in a step 711, an access point identifier 609 is output, representing a selected access point from list 209 according to current geographical location 163. In another related embodiment, access point recommendations and commands 177 are also used in making the access point selection.

A related embodiment of the invention provides a set of non-transitory device-readable executable instructions contained in a storage unit, such that when the instructions are read from the storage unit and executed by a device, the device is caused to perform a method of the invention, or a combination of methods as disclosed herein.

Various aspects of specific embodiments discussed herein may be combined with aspects from other embodiments. The present invention is not limited by what has been particularly shown and described herein, but rather the scope of the invention is defined by the appended claims.

What is claimed is:

1. A method for compiling at least one predictive offload access point list for at least one vehicle, the at least one list containing at least one prospective access point for establishing a non-cellular wireless Internet connection for the at least one vehicle, the method comprising processor implemented steps of:

selecting the at least one prospective access point according to a backhaul quality, the at least one prospective access point has an available bitrate sufficient to support a bitrate required by a data connection to be offloaded, and the at least one prospective access point has a current loading less than a predetermined threshold;

receiving at least one vehicle metric specifying at least one vehicle-related state of the at least one vehicle operative for extraction current and predicted look-ahead status for the at least one vehicle;

responsive to the current, planned and predicted look-ahead status of the at least one vehicle, filtering at least one prospective access point to balance load of the at least one prospective access point and to obtain the at least one predictive offload access point list; and responsive to the at least one predictive offload access point list, extracting schedule strategies for data loading.

2. The method of claim 1, further comprising receiving a suggested access point policy, and wherein filtering the at least one access point is further according to the suggested access point policy.

3. The method of claim 1, wherein the at least one predictive offload access point list contains a plurality of access points, and further comprising selecting from the at least one predictive offload access point list a single access point for establishing the non-cellular wireless Internet connection.

4. The method of claim 1, wherein the at least one predictive offload access point list contains a plurality of access points corresponding to successive locations of a predictive route of the at least one vehicle.

5. The method of claim 4, wherein the at least one predictive offload access point list contains a plurality of access points corresponding to a predictive look-ahead for a plurality of possible routes which diverge from a current route of the at least one vehicle as alternative route choices.

6. A system for compiling at least one predictive offload access point list for at least one vehicle, the at least one list containing at least one prospective access point for establishing a non-cellular wireless Internet connection for the at least one vehicle, the system comprising:

a processing device for:

selecting the at least one prospective access point according to a backhaul quality, the at least one prospective access point has an available bitrate sufficient to support a bitrate required by a data connection to be offloaded, and the at least one prospective access point has a current loading less than a predetermined threshold;

receiving at least one vehicle metric specifying at least one vehicle-related state of the at least one vehicle, operative for extraction current and predicted look-ahead status for the at least one vehicle;

responsive to the current, planned and predicted look-ahead status of the at least one vehicle, filtering the at least one access point to balance load of the at least one prospective access point and to obtain the at least one predictive offload access point list; and responsive to the at least one predictive offload access point list, extracting schedule strategies for data loading.

7. The system of claim 6, wherein the processing device is further for receiving a suggested access point policy, and wherein filtering the at least one access point is further according to the suggested access point policy.

8. The system of claim 6, wherein the at least one predictive offload access point list contains a plurality of access points, and wherein the processing device is further for selecting from the at least one predictive offload access point list a single access point for establishing the non-cellular wireless Internet connection.

9. The system of claim 6, wherein the at least one predictive offload access point list contains a plurality of access points corresponding to successive locations of a predictive route of the at least one vehicle.

10. The system of claim 9, wherein the at least one predictive offload access point list contains a plurality of access points corresponding to a predictive look-ahead for a plurality of possible routes which diverge from a current route of the at least one vehicle as alternative route choices.

* * * * *